US010753407B2

(12) United States Patent
Ono et al.

(10) Patent No.: US 10,753,407 B2
(45) Date of Patent: Aug. 25, 2020

(54) WORK VEHICLE

(71) Applicant: Iseki & Co., LTD, Ehime-ken (JP)

(72) Inventors: Koki Ono, Ehime-ken (JP); Tomoyuki Ishida, Ehime-ken (JP); Yutaka Kajino, Ehime-ken (JP); Yuji Yoshizawa, Ehime-ken (JP); Tatsuzo Murakami, Ehime-ken (JP)

(73) Assignee: ISEKI & CO., LTD, Matsuyama-Shi (JP)

( * ) Notice: Subject to any disclaimer, the term of this patent is extended or adjusted under 35 U.S.C. 154(b) by 0 days.

(21) Appl. No.: 16/296,429

(22) Filed: Mar. 8, 2019

(65) Prior Publication Data

US 2020/0166087 A1 May 28, 2020

(30) Foreign Application Priority Data

Nov. 28, 2018 (JP) ................................ 2018-222797

(51) Int. Cl.
*F16D 25/10* (2006.01)
*F16H 3/08* (2006.01)
*F16D 48/02* (2006.01)
*F16H 61/00* (2006.01)

(52) U.S. Cl.
CPC ............. *F16D 25/14* (2013.01); *F16D 25/10* (2013.01); *F16H 3/08* (2013.01); *F16H 61/0021* (2013.01); *F16H 2003/0826* (2013.01); *F16H 2200/006* (2013.01)

(58) Field of Classification Search
None
See application file for complete search history.

(56) References Cited

U.S. PATENT DOCUMENTS

| 3,707,890 | A | * | 1/1973 | Ito ......................... F16H 61/065 477/151 |
| 3,915,274 | A | * | 10/1975 | Utter ................... F16D 25/0638 192/3.57 |
| 4,673,072 | A | * | 6/1987 | Hosono .................. B60K 23/08 180/247 |
| 4,742,731 | A | * | 5/1988 | Eldridge ................. F16H 61/12 192/109 F |

(Continued)

FOREIGN PATENT DOCUMENTS

JP 2016-125603 A 7/2016

*Primary Examiner* — Colby M Hansen
(74) *Attorney, Agent, or Firm* — Finnegan, Henderson, Farabow, Garrett & Dunner LLP

(57) ABSTRACT

A work vehicle includes a hydraulic main speed change clutch and a Hi-Lo clutch provided to a power transmission device for transmitting power to drive wheels, and a speed change control device configured to control vehicle speed in multi-stage manner by a combination of the main speed change clutch and the hydraulic Hi-Lo clutch. In shift-up operation for changing the speed from a low speed stage range to a high speed stage range in which a high speed clutch is used, before completion of speed change, the high speed clutch pressure is kept at a first pressure (Pa) higher than the low speed clutch pressure while the pressure of the main speed change clutch, which is a speed change source, is kept, so that the power is transmitted by a combination of the high speed clutch and the main speed change clutch, which is a speed change source.

4 Claims, 9 Drawing Sheets

| SUB-SPEED CHANGE | MAIN SPEED CHANGE | MAIN SPEED CHANGE CLUTCH | Hi-Lo SPEED CHANGE CLUTCH |
|---|---|---|---|
| ULTRALOW SPEED | 1 | 1 | Lo |
| | 2 | 2 | Lo |
| LOW SPEED | 3 | 3 | Lo |
| | 4 | 4 | Lo |
| MEDIUM SPEED | 5 | 1 | Hi |
| | 6 | 2 | Hi |
| HIGH SPEED | 7 | 3 | Hi |
| | 8 | 4 | Hi |

(56) References Cited

U.S. PATENT DOCUMENTS 8,690,720 B2 * 4/2014 Takei .................. F16H 61/0021
192/3.57
2010/0140034 A1 * 6/2010 Greenwood ............ F16H 15/38
192/3.57

* cited by examiner

FIG. 5

| SUB-SPEED CHANGE | MAIN SPEED CHANGE | MAIN SPEED CHANGE CLUTCH | Hi-Lo SPEED CHANGE CLUTCH |
|---|---|---|---|
| ULTRALOW SPEED . . LOW SPEED . . MEDIUM SPEED . . HIGH SPEED | 1 | 1 | Lo |
| | 2 | 2 | Lo |
| | 3 | 3 | Lo |
| | 4 | 4 | Lo |
| | 5 | 1 | Hi |
| | 6 | 2 | Hi |
| | 7 | 3 | Hi |
| | 8 | 4 | Hi |

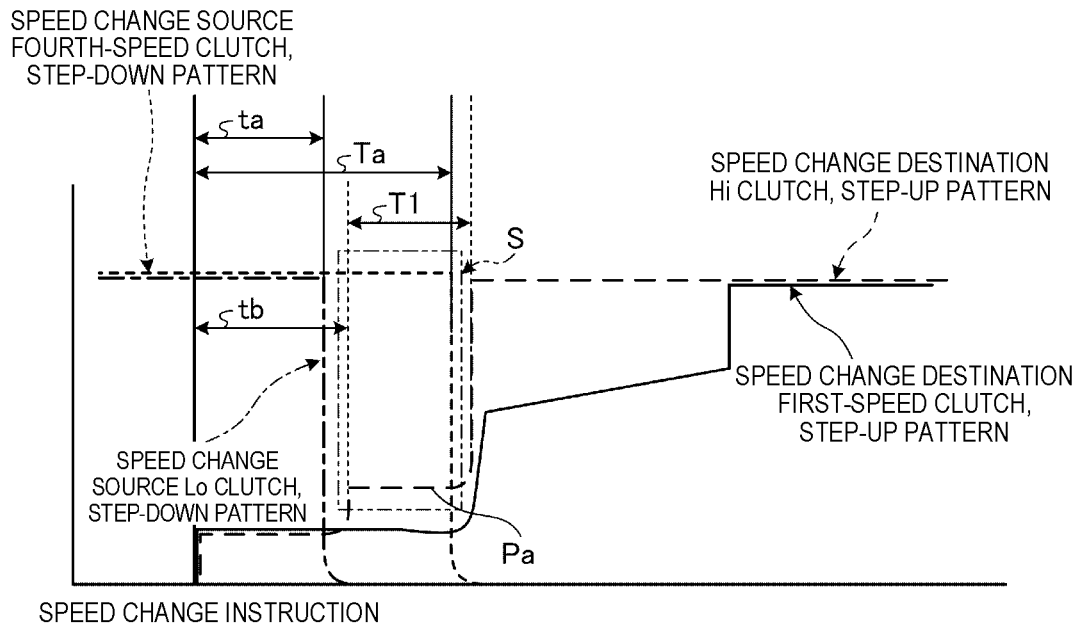
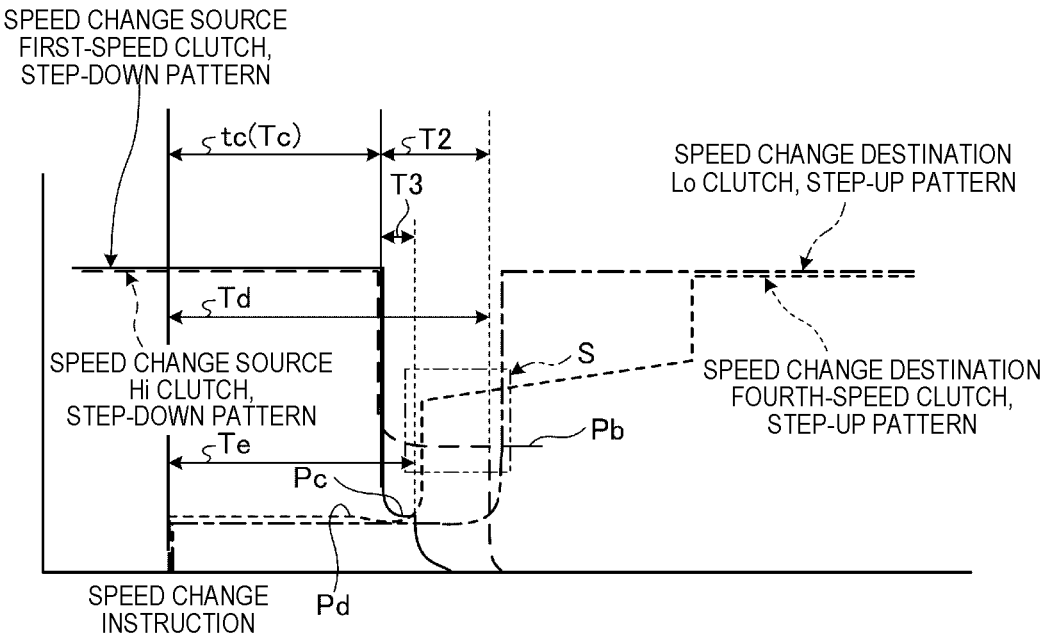

WORK VEHICLE

CROSS REFERENCE TO RELATED APPLICATIONS

This application claims priority to Japanese Patent Application No. 2018-222797, filed Nov. 28, 2018, the disclosure of which is incorporated herein by reference in its entirety.

BACKGROUND

The present disclosure relates to a work vehicle and a method for controlling work vehicle speed change.

In the related art, a work vehicle configured to change a speed by a combination of a main speed change clutch and a high-low clutch ("Hi-Lo clutch") configured to operate by a hydraulic pressure has been known. In the work vehicle, a technology of, when switching the main speed change clutch and the high-low clutch at the same time, keeping the high-low clutch, which is a speed change source, at a low pressure until the main speed change clutch, which is a speed change destination, increases to a predetermined pressure and suppressing complete power disconnection to suppress a speed change shock has been known (see, for example, Japanese Patent Application No. JP-A-2016-125603).

However, a concern of a configuration according to JP-A-2016-125603, may be that the speed change shock may be still caused during a heavy load work.

SUMMARY

Some embodiments of the present disclosure have been made in light of the above situation. An object of some embodiments of the present disclosure may be to provide a work vehicle and a method for controlling work vehicle speed change, which can reduce as much as possible a speed change-induced shock during speed change and thus improve the speed change feeling.

Some embodiments of the disclosure may address problems such as those discussed above and achieve the above object by providing a work vehicle according to a first aspect. A work vehicle according to the first aspect may include a power transmission device configured to transmit rotation power from an engine to drive wheels, the power transmission device including a plurality of hydraulic main speed change clutches for a plurality of speed change stages and a hydraulic Hi-Lo clutch having a high speed clutch and a low speed clutch and capable of changing a speed at a high speed stage or a low speed stage, and configured to transmit power via the main speed change clutches and the Hi-Lo clutch; control valves configured to adjust pressed states of the main speed change clutches and the Hi-Lo clutch; and a speed change control device configured to control and change a vehicle speed in a multi-stage manner by the main speed change clutches and the Hi-Lo clutch, wherein in a shift-up operation for changing a speed from a low speed stage range in which the low speed clutch is used to a high speed stage range in which the high speed clutch is used, the speed change control device decreases the pressure of the low speed clutch while keeping the pressure of the high speed clutch at a first pressure higher than the pressure of the low speed clutch and keeping the pressure of the main speed change clutch, which is a speed change source, to transmit power by a combination of the high speed clutch and the main speed change clutch, which is a speed change source, and then decreases the pressure of the main speed change clutch, which is a speed change source, while increasing the pressure of the high speed clutch, which has been kept at the first pressure, and increasing the pressure of the main speed change clutch, which is a speed change destination.

A second aspect of the disclosure is directed to the work vehicle according to the first aspect, in which the speed change control device has an initial time for the main speed change clutch, which is to be calculated on the basis of a reference time until the main speed change clutch reaches a predetermined pressure, supplies an operating oil to an oil chamber for operating the main speed change clutch, which is a speed change destination, while the initial time for the main speed change clutch elapses after a speed change instruction, and has a time period in which a time for which the pressure of the high speed clutch is kept at the first pressure higher than the pressure of the low speed clutch and the initial time for the main speed change clutch elapse at the same time.

A third aspect of the disclosure is directed to a work vehicle including: a power transmission device configured to transmit rotation power from an engine to drive wheels, the power transmission device including a plurality of hydraulic main speed change clutches for a plurality of speed change stages and a hydraulic Hi-Lo clutch having a high speed clutch and a low speed clutch and capable of changing a speed at a high speed stage or a low speed stage, and configured to transmit power via the main speed change clutches and the Hi-Lo clutch; control valves configured to adjust pressed states of the main speed change clutches and the Hi-Lo clutch; and a speed change control device configured to control and change a vehicle speed in a multi-stage manner by the main speed change clutches and the Hi-Lo clutch, wherein in a shift-down operation for changing a speed from a high speed stage range in which the high speed clutch is used to a low speed stage range in which the low speed clutch is used, the speed change control device keeps the pressure of the high speed clutch at a second pressure higher than a pressure of the low speed clutch, decreases the pressure of the main speed change clutch, which is a speed change source, while keeping the pressure of the high speed clutch, starts a rise in the pressure of the main speed change clutch, which is a speed change destination, and then decreases the pressure of the high speed clutch, which has been kept at the second pressure and increases the pressure of the low speed clutch.

A fourth aspect of the disclosure is directed to the work vehicle according to the third aspect, in which the speed change control device has an initial time for the low speed clutch, which is to be calculated on the basis of a reference time until the low speed clutch reaches a predetermined pressure, supplies an operating oil to an oil chamber for operating the low speed clutch while the initial time elapses after a speed change instruction, and decreases the pressure of the main speed change clutch, which is a speed change source, and starts a rise in the pressure of the main speed change clutch, which is a speed change destination, while the initial time of the low speed clutch elapses.

In the work vehicle according to the first aspect, during the speed change accompanied by the switching from the low speed stage to the high speed stage of the Hi-Lo clutch, the power is transmitted by the combination of the high speed clutch of the Hi-Lo clutch and the speed change stage of the speed change source of the main speed change clutch. That is, until the Hi-Lo clutch and the main speed change clutch are switched from the speed change source to the speed change destination, the power is transmitted by the combination of the speed change destination-side of the Hi-Lo clutch, which is the high speed stage, and the speed change source-side of the main speed change clutch, so that the power disconnection is suppressed to obtain a favorable speed change feeling.

In the work vehicle according to the second aspect, in addition to the effect of the first aspect, the operating oil is supplied to the oil chamber of the main speed change clutch, which is a speed change destination, while keeping the pressure of the speed change source of the Hi-Lo clutch. Thereby, after the operation of keeping the pressure of the speed change source of the Hi-Lo clutch is over, the operating oil is supplied to the oil chamber of the main speed change clutch having completed the filling, so that it is possible to rapidly increase the pressure of the speed change destination of the main speed change clutch. Accordingly, it is possible to suppress the power disconnection, thereby obtaining the favorable speed change feeling.

In the work vehicle according to the third aspect, when the shift operation is performed from the high speed stage to the low speed stage by the Hi-Lo clutch, the power is transmitted by the combination of the high speed clutch of the Hi-Lo clutch and the speed change stage of the speed change destination of the main speed change clutch. That is, until the Hi-Lo clutch and the main speed change clutch are switched from the speed change source to the speed change destination, the power is transmitted by the combination of the speed change source-side of the Hi-Lo clutch, which is the high speed stage, and the speed change stage of the speed change destination-side of the main speed change clutch, so that the power disconnection is suppressed to obtain the favorable speed change feeling.

In the device for controlling work vehicle speed change according to the fourth aspect, in addition to the effect of the third aspect, while the operating oil is supplied to the oil chamber of the low speed clutch of the Hi-Lo clutch, the pressure of the main speed change clutch of the speed change source is decreased and the pressure rise of the main speed change clutch of the speed change destination starts. Thereby, after the pressure rise of the main speed change clutch of the speed change destination starts to switch the main speed change clutch, the operating oil is supplied to the oil chamber of the low speed clutch of the Hi-Lo clutch having completed the filling, so that it is possible to rapidly increase the pressure of the low speed clutch of the Hi-Lo clutch. Accordingly, it is possible to suppress the power disconnection, thereby obtaining the favorable speed change feeling.

Objects and advantages of the disclosed embodiments may be realized and attained by the elements and combinations that may be set forth in the claims. However, embodiments of the present disclosure are not necessarily required to achieve such exemplary objects and advantages, and some embodiments may not achieve any of the objects and advantages discussed above.

BRIEF DESCRIPTION OF DRAWINGS

FIG. 5 is a table showing combinations of a main speed change clutch and a Hi-Lo clutch during multi-stage speed change.

FIG. 9 is a timing chart depicting an example of speed change control from a high speed stage range to a low speed stage range.

FIG. 10 is a timing chart depicting an example of speed change control from the low speed stage range to the high speed stage range.

DESCRIPTION OF EXEMPLARY EMBODIMENTS

Reference will now be made in detail to illustrative embodiments of a work vehicle and a method for controlling work vehicle speed change with reference to the drawings. It will be understood that the present disclosure is not limited to the illustrative embodiments. Also, the constitutional elements of the illustrative embodiments may include those that can be easily replaced by one skilled in the art or are substantially the same.

Figure 1:
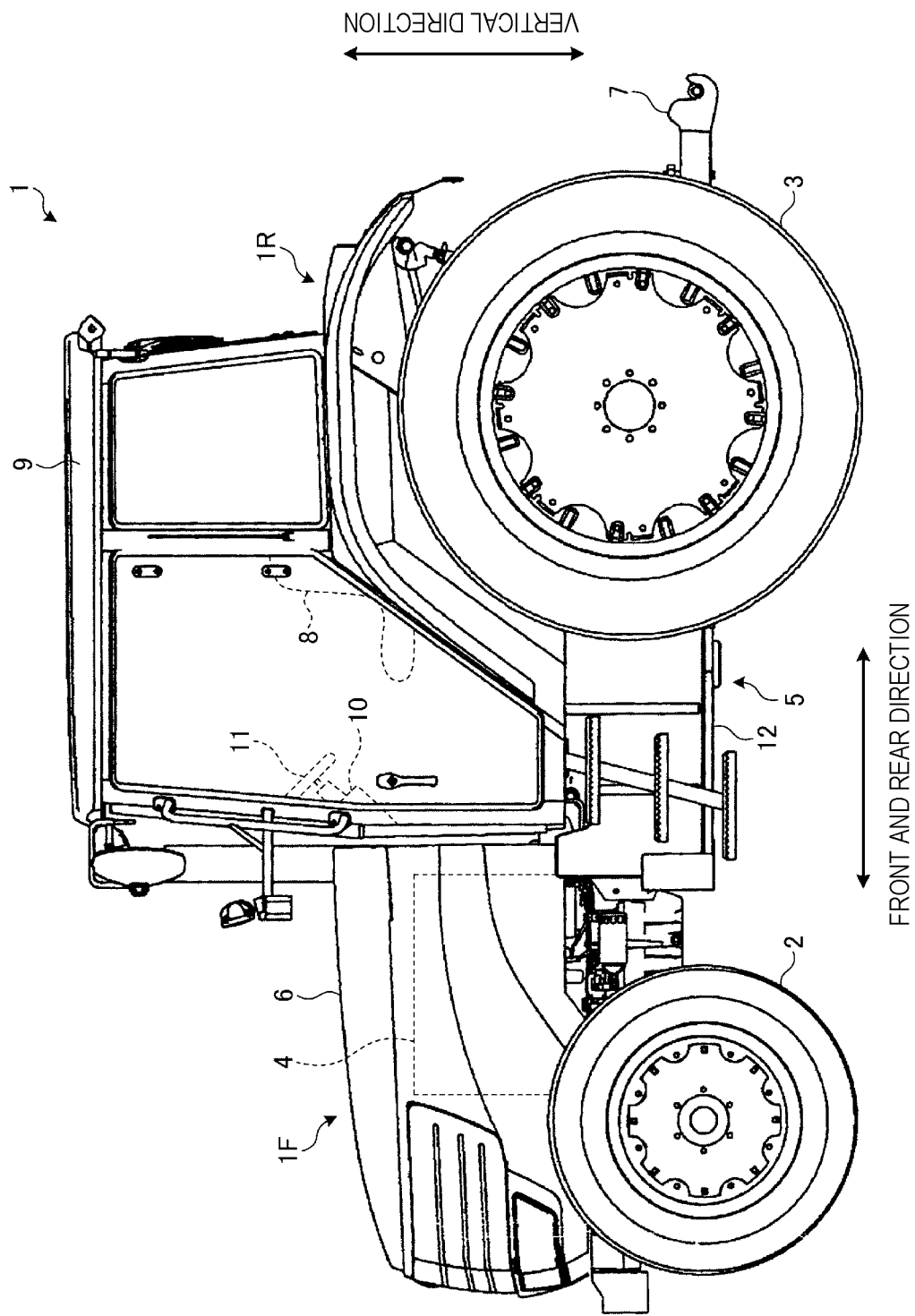
FIG. 1 is a schematic side view of a work vehicle.
Figure 2:
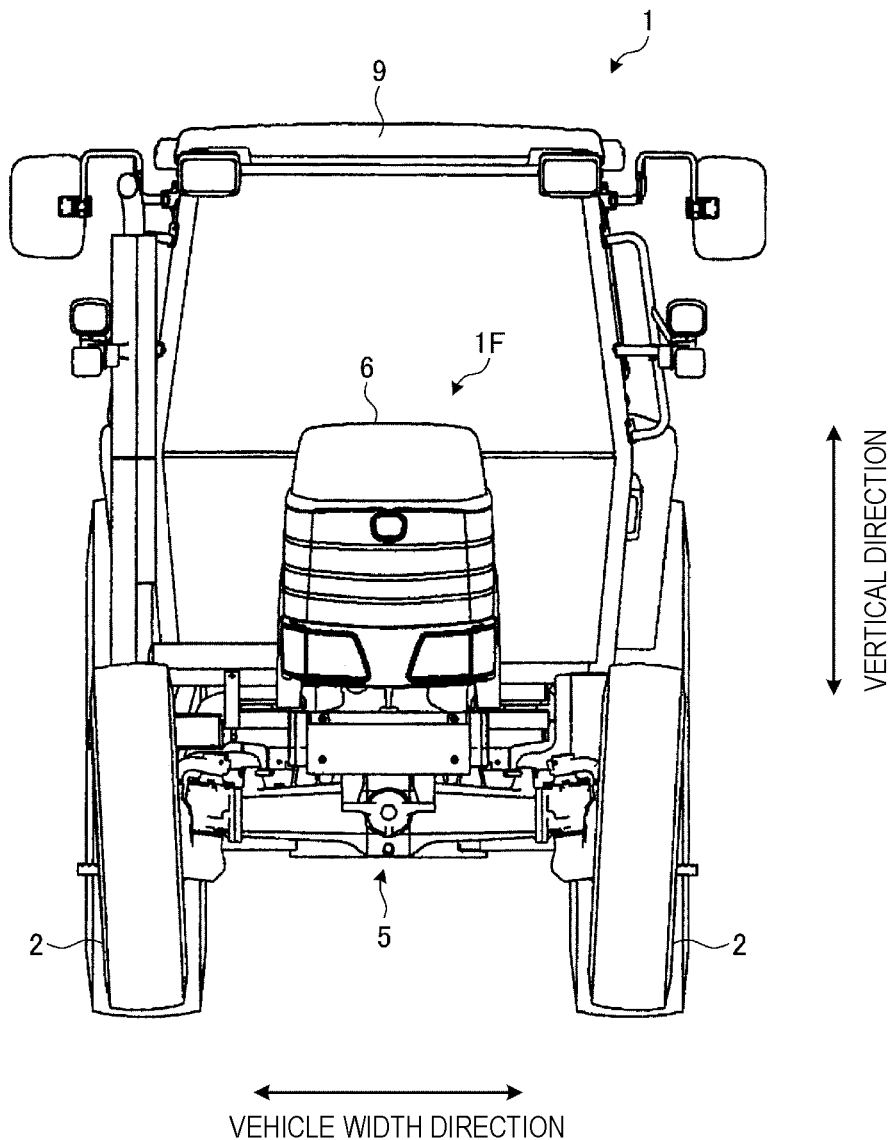
FIG. 2 is a schematic front view of the work vehicle.

FIG. 1 is a schematic side view of a work vehicle, and FIG. 2 is a schematic front view of the work vehicle. In below descriptions, a tractor is exemplified as the work vehicle. Also, in the below descriptions, the front and rear direction indicates the front and rear direction of the work vehicle, i.e., the tractor. More specifically, the front and rear direction indicates a traveling direction in which the tractor is to travel straight, the front side in the traveling direction is defined as the front side in the front and rear direction, and the rear side is defined as the rear side in the front and rear direction. The traveling direction of the tractor is a direction facing from a driver seat toward a steering wheel when the tractor travels straight, the steering wheel-side is the front side and the driver seat-side is the rear side. Also, the vehicle width direction is a direction horizontally perpendicular to the front and rear direction. Here, when seeing the front side in the front and rear direction, the right side is defined as the right side in the vehicle width direction, and the left side is defined as the left side in the vehicle width direction. Also, the vertical direction is a direction perpendicular to the front and rear direction and the vehicle width direction. In the meantime, the front and rear direction, the vehicle width direction and the vertical direction are perpendicular to each other.

As shown in FIGS. 1 and 2, a tractor 1, which is a work vehicle, is an agricultural tractor configured to perform a work at a farm field while self-propelled by a drive force generated from a drive source. The tractor 1 includes front wheels 2, rear wheels 3, an engine 4 as a drive source, and a speed change device (transmission) 5. The front wheels 2 are mainly provided as vehicle wheels for steering (steered wheels). Also, the rear wheels 3 are mainly provided as vehicle wheels for drive (drive wheels). To the rear wheels 3, rotation power generated from the engine 4 mounted in a bonnet 6 of a vehicle body front part 1F can be transmitted with being appropriately decelerated at the speed change device 5. The rear wheels 3 generate a drive force by the rotation power.

Also, the speed change device 5 can transmit the rotation power generated from the engine 4 to the front wheels 2, too, as required. In this case, the four wheels of the front wheels 2 and the rear wheels 3 become the drive wheels and generate the drive force. That is, the speed change device 5 can switch two-wheeled drive and four-wheeled drive, and can decelerate the rotation power of the engine 4 and transmit the decelerated rotation power to the front wheels 2 and the rear wheels 3.

Also, a vehicle body rear part 1R of the tractor 1 is provided with a coupling device 7 to which a variety of work machines (not shown) such as a rotary machine can be mounted. The coupling device 7 is configured to couple the work machine to the vehicle body rear part 1R of the tractor 1 by left and right lower links, a central top link and the like, for example. The tractor 1 can raise/lower the work machine via a lift rod or the lower links coupled to the lift rod by hydraulically rotating left and right lift arms, for example.

The tractor 1 has a driver seat 8 on a vehicle body, which is surrounded by a cabin 9. In the cabin 9 of the tractor 1, a steering wheel 11 is provided at a dashboard 10 in front of the driver seat 8, and a variety of operation pedals such as a clutch pedal and an accelerator pedal and a variety of operation levers such as a forward/reverse lever and a speed change lever, which are not shown, are provided at the periphery of the driver seat 8.

Figure 3:
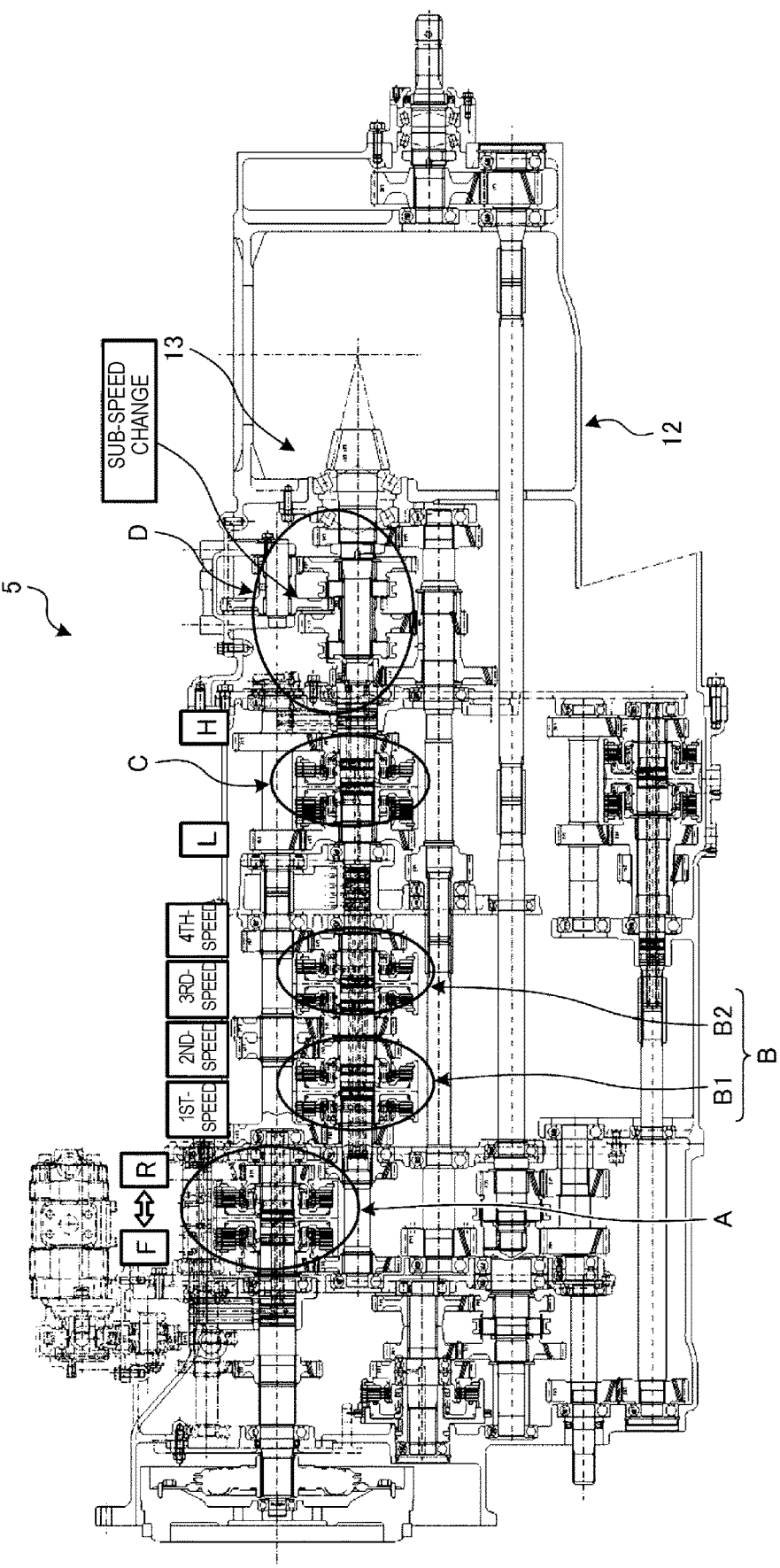
FIG. 3 illustrates a speed change device arranged in a transmission case.
Figure 4:
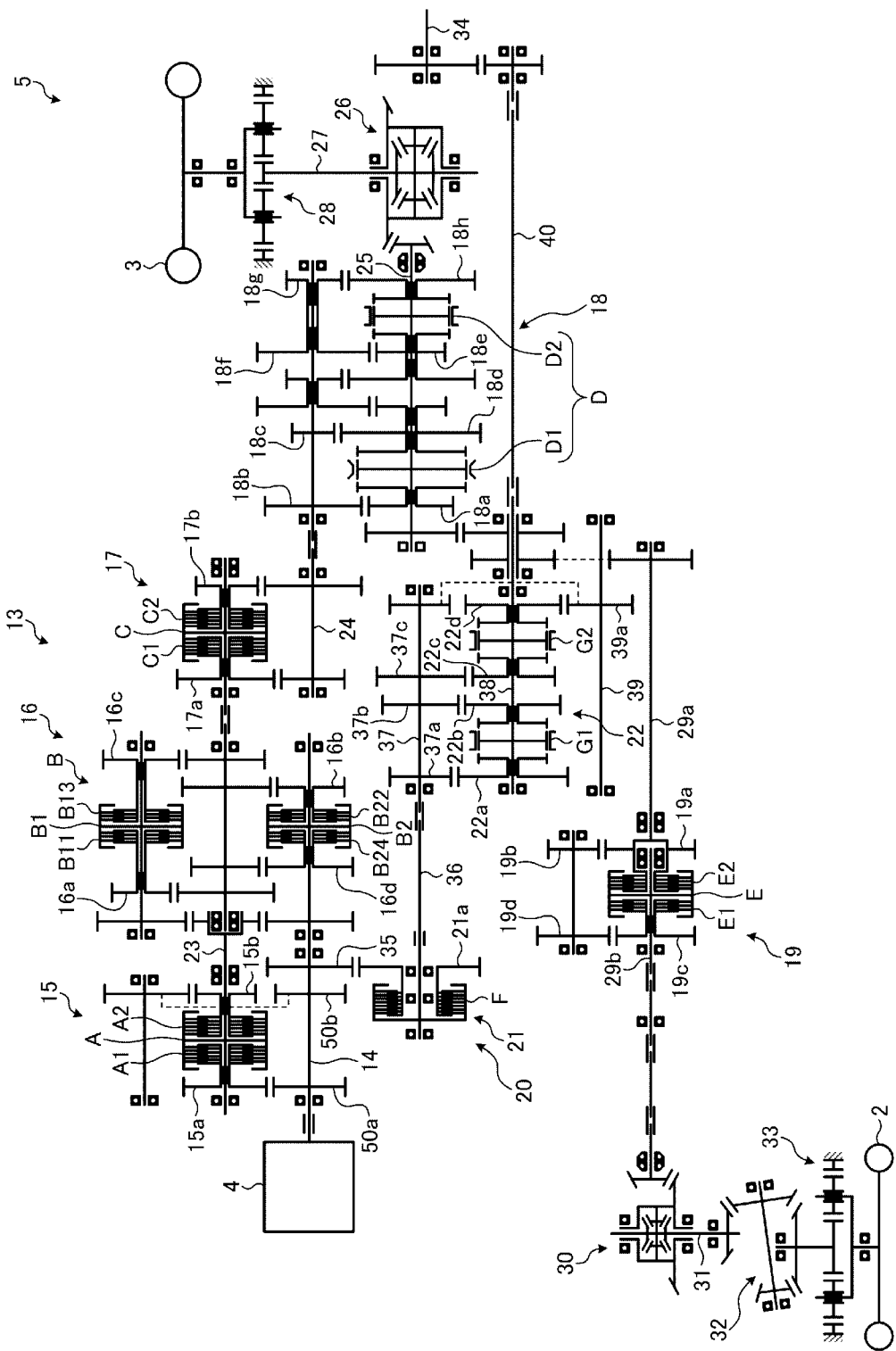
FIG. 4 is a line diagram depicting power transmission paths of the speed change device.

FIG. 3 illustrates the speed change device arranged in a transmission case, and FIG. 4 is a line diagram depicting power transmission paths of the speed change device 5. As shown in FIG. 3, the speed change device 5 includes a transmission case 12 (refer to FIG. 1), and a power transmission device 13 arranged in the transmission case 12. The power transmission device 13 is a mechanism configured to transmit the rotation power from the engine 4 shown in FIG. 1 to the front wheels 2, the rear wheels 3 and the like, and is configured to transmit the rotation power of the engine 4, thereby driving the front wheels 2, the rear wheels 3 and the work machine.

As shown in FIG. 4, the power transmission device 13 includes an input shaft 14, a forward/reverse switching device 15, a main speed change device 16, a high-low speed change device 17, a sub-speed change device 18, a front wheel speed change device 19, and a PTO (Power take-off) drive device 20.

The power transmission device 13 is configured to transmit the rotation power generated by the engine 4 to the rear wheels 3 via the input shaft 14, the forward/reverse switching device 15, the main speed change device 16, the high-low speed change device 17, and the sub-speed change device 18 in corresponding order. Also, the power transmission device 13 is configured to transmit the rotation power generated by the engine 4 to the front wheels 2 via the input shaft 14, the forward/reverse switching device 15, the main speed change device 16, the high-low speed change device 17, the sub-speed change device 18, and the front wheel speed change device 19 in corresponding order. Also, the power transmission device 13 is configured to transmit the rotation power generated by the engine 4 to the work machine via the input shaft 14 and the PTO drive device 20 in corresponding order.

The input shaft 14 is coupled to an output shaft of the engine 4 and is transmitted (input) thereto with the rotation power from the engine 4. Meanwhile, as discussed below, regarding a direction of power transmission, the engine 4-side may be considered a power transmission upstream side, and the front wheel 2, the rear wheel 3 and the work machine-side, which are final output destinations, may be considered a power transmission downstream side.

The forward/reverse switching device 15 is configured to switch the rotation power transmitted from the engine 4 to forward rotation or reverse rotation. The forward/reverse switching device 15 includes a forward hydraulic multiplate clutch (hereinafter, referred to as "forward clutch") A1, a reverse hydraulic multiplate clutch (hereinafter, referred to as "reverse clutch") A2, a forward gear 15a, and a reverse gear 15b. The forward clutch A1 and the reverse clutch A2 configure a forward/reverse clutch A, and can switch between, for example, forward movement F and reverse movement R of the tractor 1 (refer to FIG. 3).

As shown in FIG. 4, the forward/reverse clutch A is configured to transmit the rotation power, which has been transmitted to the input shaft 14, to a main shaft 23, in correspondence with engaged and disengaged states of the forward clutch A1 and the reverse clutch A2. When the forward clutch A1 is in the engaged state, the forward gear 15a is meshed with a forward rotation gear 50a, so that the forward/reverse clutch A rotates the main shaft 23 in a forward direction. Also, when the reverse clutch A2 is in the engaged state, the reverse gear 15b is meshed with a reverse rotation gear 50b, so that the forward/reverse clutch A rotates the main shaft 23 in a reverse direction. Thereby, the forward/reverse clutch A can switch the forward movement and reverse movement of the tractor 1 by the forward rotation and reverse rotation of the main shaft 23. In the meantime, the forward/reverse clutch A can switch the forward movement and reverse movement by hydraulic control as the forward/reverse lever is operated at the driver seat 8 (refer to FIG. 1), for example. Also, both the forward clutch A1 and the reverse clutch A2 can be in the disengaged state (neutral state) by depressing the clutch pedal.

The main speed change device 16 can change the speed of the rotation power transmitted from the engine 4 at one of a plurality of speed change stages. The main speed change device 16 includes a first main speed change clutch B1, a second main speed change clutch B2, and a first-speed gear 16a, a second-speed gear 16b, a third-speed gear 16c, and a fourth-speed gear 16d, as the plurality of speed change stages. The first main speed change clutch B1 and the second main speed change clutch B2 configure a main speed change clutch B (refer to FIG. 3).

As shown in FIG. 4, the first main speed change clutch B1 includes a hydraulic multiplate clutch (hereinafter, referred to as "first-speed clutch") B11 and a hydraulic multiplate clutch (hereinafter, referred to as "third-speed clutch") B13, and the first-speed clutch B11-side is provided with the first-speed gear 16a and the third-speed clutch B13-side is provided with the third-speed gear 16c. Also, the second main speed change clutch B2 includes a hydraulic multiplate clutch (hereinafter, referred to as "second-speed clutch") B22 and a hydraulic multiplate clutch (hereinafter, referred to as "fourth-speed clutch") B24, and the second-speed clutch B22-side is provided with the second-speed gear 16b and the fourth-speed clutch B24-side is provided with the fourth-speed gear 16d.

The main speed change clutch B can change the speed of the rotation power from the engine 4 with a change gear ratio of one of the first-speed gear 16a to the fourth-speed gear 16d and transmit the rotation power to the rear stage, i.e., the power transmission downstream side, in correspondence with the engaged/disengaged states of the first main speed change clutch B1 and the second main speed change clutch B2. In the meantime, the main speed change lever is operated at the driver seat 8 (refer to FIG. 1), for example, so that the main speed change clutch B can change the speed by selecting one of the first-speed gear 16a to the fourth-speed gear 16d. Also, the speed change operation can be performed during the traveling of the tractor 1.

The high-low speed change device 17 can change the speed of the rotation power transmitted from the engine 4 at the high speed stage H or the low speed stage L (refer to FIG.

3). The high-low speed change device 17 includes a Hi (high speed) hydraulic multiplate clutch (hereinafter, referred to as "high speed clutch" or "Hi clutch") C1, a Lo (low speed) hydraulic multiplate clutch (hereinafter, referred to as "low speed clutch" or "Lo clutch") C2, a Hi (high speed) gear 17a, and a Lo (low speed) gear 17b. The Hi clutch C1 and the Lo clutch C2 configure a Hi-Lo clutch C (refer to FIG. 3).

As shown in FIG. 4, the Hi-Lo clutch C is configured to change a transmission path of the rotation power transmitted to the main shaft 23 and to transmit the rotation power to a speed change shaft 24, in correspondence with engaged/disengaged states of the Hi clutch C1 and the Lo clutch C2. Specifically, when the Hi clutch C1 is in the engaged state and the Lo clutch C2 is in the disengaged state, the Hi-Lo clutch C changes the speed of the rotation power, which has been transmitted to the main shaft 23, via the Hi clutch C1 and the Hi gear 17a and transmits the rotation power to the speed change shaft 24. Also, when the Hi clutch C1 is in the disengaged state and the Lo clutch C2 is in the engaged state, the Hi-Lo clutch C changes the speed of the rotation power, which has been transmitted to the main shaft 23, via the Lo clutch C2 and the Lo gear 17b and transmits the rotation power to the speed change shaft 24. Thereby, the Hi-Lo clutch C can change the speed of the rotation power changed by the main speed change clutch B with a change gear ratio of the Hi gear 17a or a change gear ratio of the Lo gear 17b and transmit the rotation power to the rear stage, i.e., the power transmission downstream side.

Meanwhile, when the main speed change lever is operated between the fourth-speed and the fifth-speed at the driver seat 8 (refer to FIG. 1), for example, the Hi-Lo clutch C is automatically switched to the Hi-side and Lo-side by the hydraulic control, thereby configuring eight speeds including four Hi-side speeds and four Lo-side speeds. Also, the speed change operation can be performed during the traveling of the tractor 1.

FIG. 5 is a table showing combinations of the main speed change clutch B and the Hi-Lo clutch C during multi-stage speed change. As shown in FIG. 5, in the tractor 1 of an illustrative embodiment, when performing the multi-stage speed change from the first-speed to the eighth-speed by the main speed change device 16, one of the first-speed gear 16a to the fourth-speed gear 16d of the main speed change clutch B and the Hi (high speed) gear 17a or Lo (low speed) gear 17b of the Hi-Lo clutch C are combined. For example, at the fourth-speed, the fourth-speed gear 16d of the main speed change clutch B and the Lo (low speed) gear 17b of the Hi-Lo clutch C are combined, and at the fifth-speed, the first-speed gear 16a of the main speed change clutch B and the Hi (high speed) gear 17a of the Hi-Lo clutch C are combined. Likewise, for example, at the first-speed, the first-speed gear 16a of the main speed change clutch B and the Lo (low speed) gear 17b of the Hi-Lo clutch C are combined, and at the seventh-speed, the third-speed gear 16c of the main speed change clutch B and the Hi (high speed) gear 17a of the Hi-Lo clutch C are combined.

Also, as shown in FIG. 4, the sub-speed change device 18 can change the speed of the rotation power, which is to be transmitted from the engine 4 via the forward/reverse switching device 15, the main speed change device 16 and the high-low speed change device 17 in corresponding order, at one of the plurality of speed change stages. The sub-speed change device 18 includes a first sub-transmission D1 and a second sub-transmission D2. Meanwhile, the first sub-transmission D1 and the second sub-transmission D2 configure a sub-transmission D (refer to FIG. 3).

The sub-transmission D is configured to change the speed of the rotation power, which has been transmitted to the speed change shaft 24, via the first sub-transmission D1, gears 18a, 18b, gears 18c, 18d, the second sub-transmission D2, gears 18e, 18f and gears 18g, 18h and to transmit the rotation power to a speed change shaft 25. The sub-transmission D is configured to four-speed change the rotation power, which has been transmitted from the engine 4 and has been speed-changed at the main speed change device 16 and the like, and to transmit the rotation power to the rear wheels 3.

That is, the rotation of the main shaft 23 is speed-changed by the main speed change clutch B configured to achieve four speeds, the Hi-Lo clutch C configured to achieve two speeds of high and low and the sub-transmission D configured to mechanically achieve four speeds, and is finally transmitted to the speed change shaft 25. In the power transmission device 13 of the speed change device 5, since the speed change stages include four speeds, two speeds, and four speeds, the speed can be changed among a total of 32 speeds (4×2×4=32). In the meantime, the first-speed to eighth-speed of the main speed change device 16 are speed change stages obtained by combining the main speed change clutch B configured to achieve four speeds and the Hi-Lo clutch C configured to achieve two speeds of high and low.

Also, the power transmission device 13 of the speed change device 5 is configured to transmit the rotation power, which has been transmitted to the speed change shaft 25, to the rear wheels 3 via a rear wheel differential gear 26, an axle (drive shaft) 27, a planetary gear mechanism 28 and the like. As a result, the rear wheels 3 of the tractor 1 are rotatively driven by the rotation power from the engine 4, and may perform as the drive wheels.

As shown in FIG. 4, the front wheel speed change device 19 is configured to transmit the rotation power, which has been transmitted to the input shaft 14, to the rear wheels 3 and the front wheels 2. The front wheel speed change device 19 includes a front wheel speed-increasing clutch E1 and a front wheel equal-speed clutch E2. The front wheel speed-increasing clutch E1 and the front wheel equal-speed clutch E2 configure a front wheel speed change clutch E.

Also, the front wheel speed change clutch E is provided at a first front wheel drive shaft 29a, and transmits the rotation of the first front wheel drive shaft 29a to a second front wheel drive shaft 29b at equal speed when the front wheel equal-speed clutch E2 is in the engaged state. Also, when the front wheel speed-increasing clutch E1 is in the engaged state, the front wheel speed change clutch E increases the speed of the rotation of the first front wheel drive shaft 29a and transmits the rotation to the second front wheel drive shaft 29b via gears 19a, 19b and gears 19c, 19d.

The front wheel speed change clutch E is configured to transmit the rotation power, which has been transmitted to the second front wheel drive shaft 29b, to the front wheels 2 via a front wheel differential gear 30, an axle (drive shaft) 31, a vertical shaft 32, a planetary gear mechanism 33 and the like. Thereby, the tractor 1 can travel with four-wheeled drive using the front wheels 2 and the rear wheels 3.

That is, the rotation of the front wheels 2 to be transmitted from the speed change shaft 25 can rotate at speed higher than the rear wheels 3 by the front wheel speed change clutch E. Also, the sub-transmission D can change speed among ultralow speed (first-speed), low speed (second-speed), medium speed (third-speed), and high speed (fourth-speed) (refer to FIG. 5), and can change speed at the low speed to the high speed during the traveling of the work vehicle because a synchronous link is provided. In the meantime, the sub-transmission D can have a 3-speed specification. The 3-speed specification includes a specification of first-speed (low speed), second-speed (medium speed), and third-speed (high speed), a specification of second-speed (low speed), third-speed (medium speed), and fourth-speed (high speed), and the like, depending on the types of the vehicle, and the specification can be easily changed.

The PTO drive device 20 is configured to change the speed of the rotation power to be transmitted from the engine 4 and to output the rotation power from a PTO shaft 34 of the vehicle body rear part 1R (refer to FIG. 1) to the work machine, thereby driving the work machine by the power from the engine 4. As shown in FIG. 4, the PTO drive device 20 includes a PTO clutch device 21, a PTO speed change device 22, and the PTO shaft 34. The PTO drive device 20 can switch between a drive state (hereinafter, referred to as "PTO drive state," as well) in which the work machine of the vehicle body rear part 1R is driven and a non-drive state (hereinafter, referred to as "PTO non-drive state," as well) in which the drive of the work machine is stopped.

The PTO clutch device 21 is configured to switch between transmission and cutoff of the power to the PTO shaft 34. The PTO clutch device 21 includes a PTO hydraulic multiplate clutch (hereinafter, referred to as "PTO clutch") F and a gear 21a. The gear 21a is in mesh with a gear 35 provided to be rotatable integrally with the input shaft 14. When the PTO clutch F is in the engaged state, the PTO clutch is in the PTO drive state where the power is to be transmitted to the PTO shaft 34, so that the PTO clutch transmits the rotation power, which has been transmitted from the input shaft 14 to the gear 21a via the gear 35, to the transmission shaft 36. Also, when the PTO clutch F is in the disengaged state, the PTO clutch is in the PTO non-drive state (neutral state) where the power transmission to the PTO shaft 34 is to be cut off, so that the PTO clutch cuts off the transmission of the rotation power, which has been transmitted to the gear 21a, to the transmission shaft 36. Meanwhile, the PTO clutch F may be switched between the PTO drive state and the PTO non-drive state by the hydraulic control when an operator turns on/off an in-vehicle PTO on/off switch or an external PTO on/off switch, for example.

The PTO speed change device 22 may change speed when transmitting the power to the PTO shaft 34. The PTO speed change device 22 includes a first PTO speed change clutch G1 and a second PTO speed change clutch G2. When the first PTO speed change clutch G1 is connected to a gear 22a, the first PTO speed change clutch G1 transmits the rotation of a transmission shaft 37 to a PTO clutch shaft 38 at a low speed, via a gear 37a and the gear 22a. Also, when the first PTO speed change clutch G1 is connected to a gear 22b, the first PTO speed change clutch G1 transmits the rotation of the transmission shaft 37 to the PTO clutch shaft 38 at a medium speed, via a gear 37b and the gear 22b. When the second PTO speed change clutch G2 is connected to a gear 22c, the second PTO speed change clutch G2 transmits the rotation of the transmission shaft 37 to the PTO clutch shaft 38 at a high speed, via a gear 37c and the gear 22c. Also, when the second PTO speed change clutch G2 is connected to a gear 22d, the second PTO speed change clutch G2 reverses and transmits the rotation of the transmission shaft 37 to the PTO clutch shaft 38, via a gear 39a and the gear 22d provided to a counter shaft 39. The power transmitted to the PTO clutch shaft 38 rotatively drives the PTO shaft 34 via a connection shaft 40.

Figure 6:
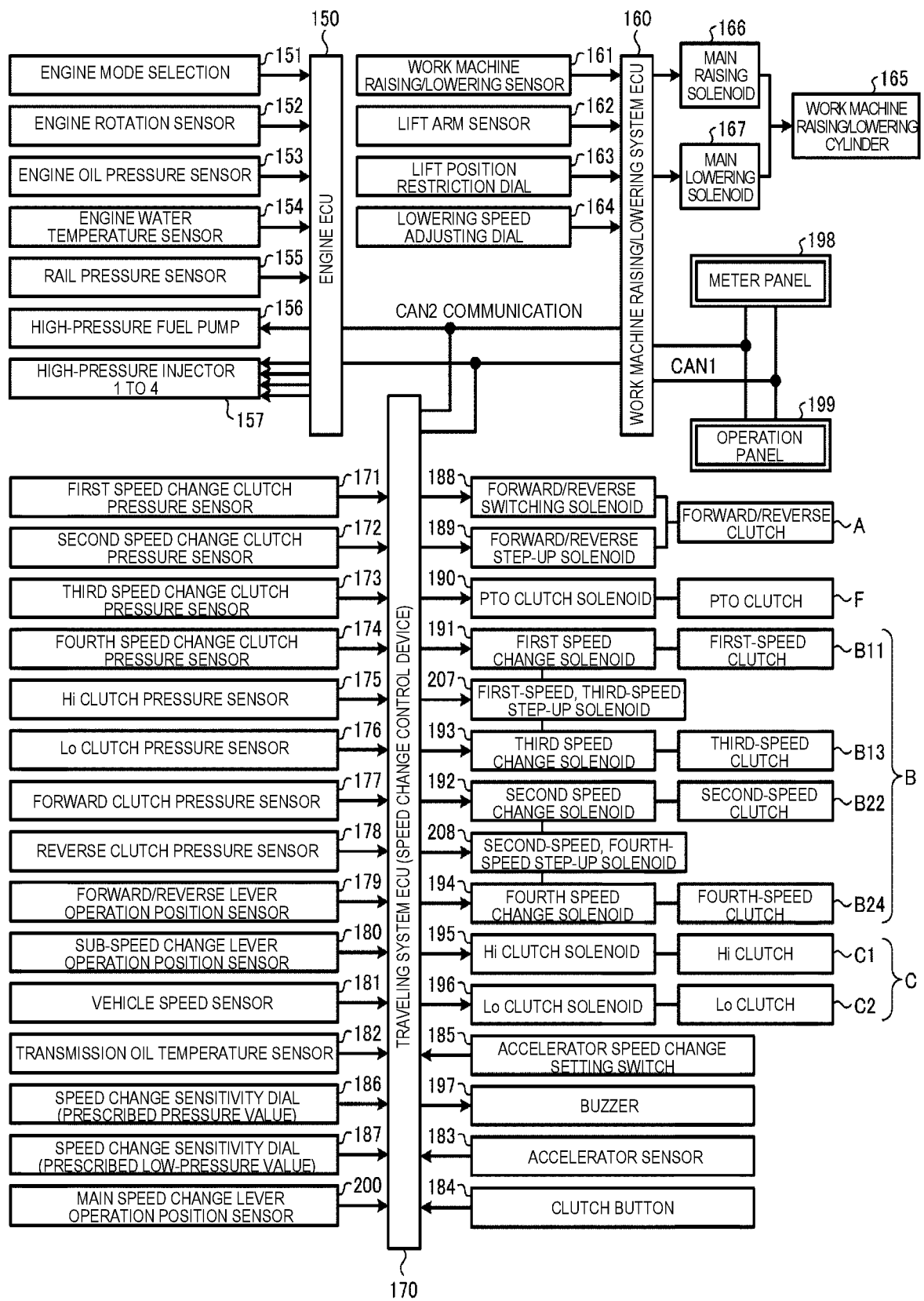
FIG. 6 is a control block diagram of respective units of the work vehicle.

FIG. 6 is a control block diagram of the respective units of the work vehicle. Here, the automatic control of the respective units of the tractor 1 (work vehicle) is described.

As shown in FIG. 6, a control system of the tractor 1 includes an engine ECU (Electronic Control Unit) 150 configured to control an output of the engine 4 (refer to FIG. 4), a work machine raising/lowering system ECU 160 configured to control raising/lowering of the work machine, and a traveling system ECU 170 (which may be included in a speed change control device) configured to control rotations of the front wheels 2 and the rear wheels 3 (refer to FIG. 4), thereby controlling a traveling speed. Traveling system ECU 170 may be programmed to implement a control routine. In some embodiments, a rotary work machine may be mounted to the tractor 1.

Control data may be input to the engine ECU 150. For example, a selection mode from an engine mode selection 151, a rotation speed of the engine 4 from an engine rotation sensor 152, an oil pressure from an engine oil pressure sensor 153, a radiator water temperature from an engine water temperature sensor 154, a pressure of a common rail from a rail pressure sensor 155 and the like are input to the engine ECU 150. Also, a drive signal to a fuel high-pressure pump 156, injection signals to four high-pressure injectors 157 and the like are output from the engine ECU 150.

To the work machine raising/lowering system ECU 160, a raising/lowering detection signal from a work machine raising/lowering sensor 161 configured to detect raising/lowering of the work machine (e.g., a rotary work machine), a lift position signal from a lift arm sensor 162, adjusting signals from a lift position restriction dial 163 and a lowering speed adjusting dial 164, and the like are input. Also, a raising signal, a lowering signal and the like are output from the work machine raising/lowering system ECU 160 to a main raising solenoid valve 166 and a main lowering solenoid valve 167 of a work machine raising/lowering cylinder (hydraulic cylinder) 165.

To the traveling system ECU (speed change control device) 170, on/off signals from pressure sensors configured to detect pressed states of the respective clutches A, B (B11, B13, B22, B24), C (C1, C2), i.e., a first speed change clutch pressure sensor 171, a second speed change clutch pressure sensor 172, a third speed change clutch pressure sensor 173, a fourth speed change clutch pressure sensor 174, a Hi clutch pressure sensor 175, a Lo clutch pressure sensor 176, a forward clutch pressure sensor 177 and a reverse clutch pressure sensor 178, an operation position from a forward/reverse lever operation position sensor 179 of a forward/reverse lever, an operation position from a sub-speed change lever operation position sensor 180 of a sub-speed change lever, an operation position from a main speed change lever operation position sensor 200 of a main speed change lever, a speed from a vehicle speed sensor 181, an oil temperature in the transmission case 12 (refer to FIG. 1) from a transmission oil temperature sensor 182, a depression signal from an accelerator sensor 183 configured to detect a depression position of an accelerator pedal, an operation signal from a clutch button 184 of the sub-speed change lever, a setting signal of an accelerator speed change setting switch 185, a set dial value of a speed change sensitivity dial 186 for setting a prescribed pressure value (a second pressure value), which will be described later, a set dial value of a speed change sensitivity dial 187 for setting a prescribed low-pressure value, which will be described later, and the like are input.

Also, from the traveling system ECU (speed change control device) 170, respective switching and step-up signals of a forward/reverse switching solenoid valve 188, a forward/reverse step-up solenoid valve 189, a PTO clutch solenoid valve 190, a first speed change solenoid valve 191, a third speed change solenoid valve 193, a second speed change solenoid valve 192, a fourth speed change solenoid valve 194, a Hi clutch solenoid valve 195, a Lo clutch solenoid valve 196, a first-speed and third-speed step-up solenoid valve 207, and a second-speed and fourth-speed step-up solenoid valve 208, a buzzer sound from a buzzer 197, and the like are output.

Also, from the engine ECU 150, the work machine raising/lowering system ECU 160 and the traveling system ECU (speed change control device) 170, a traveling speed, a speed change position, an engine water temperature and other data of the respective output data are displayed on a meter panel 198 and an operation panel 199 arranged in front of the steering wheel 11.

Figure 7:
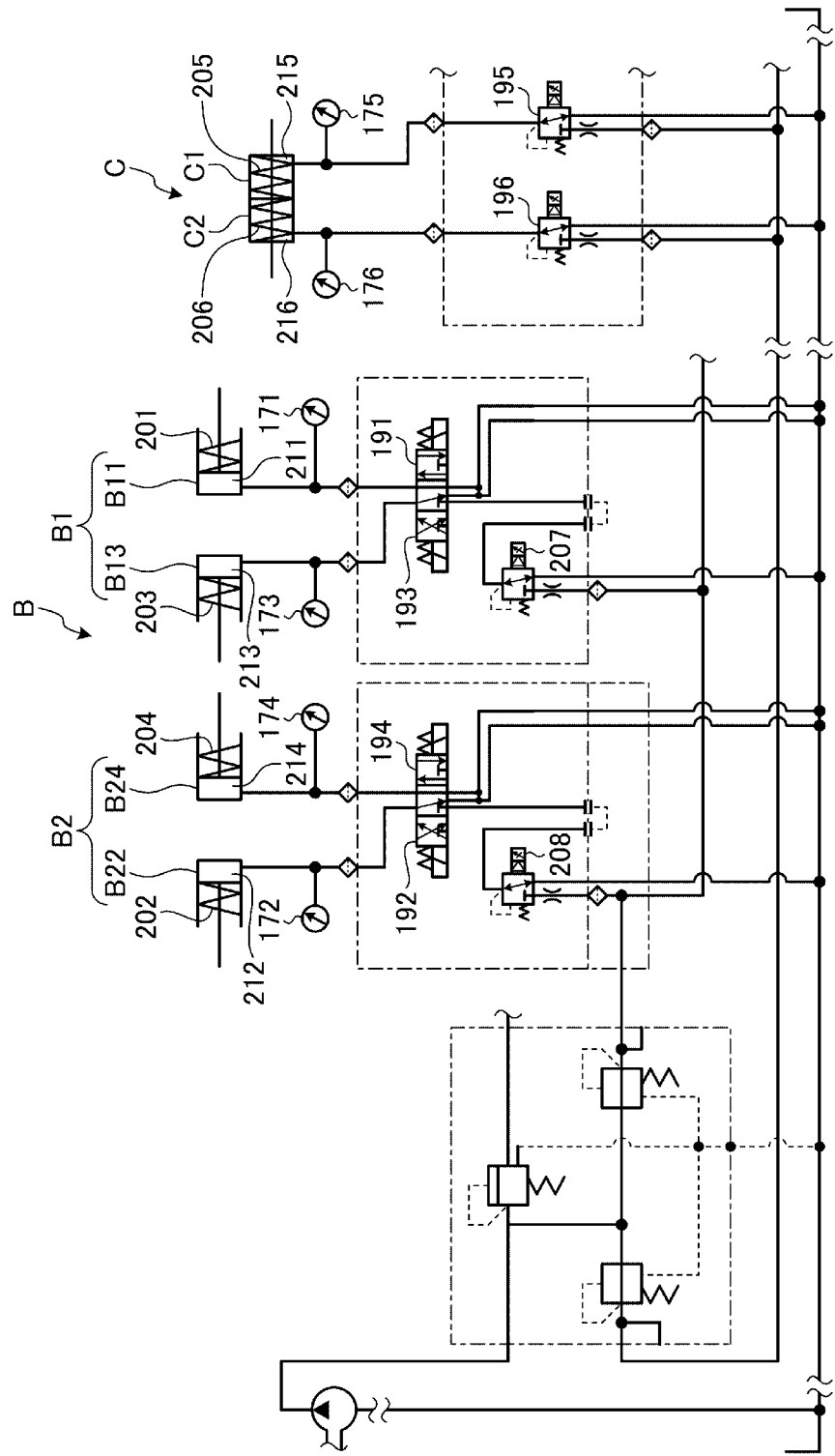
FIG. 7 is a hydraulic circuit diagram of clutches.

FIG. 7 is a hydraulic circuit diagram of the clutches. As shown in FIG. 7, the tractor 1 (refer to FIG. 1) as the work vehicle is configured to adjust the pressed states of the main speed change clutch B (the first main speed change clutch B1 and the second main speed change clutch B2) and the Hi-Lo clutch C. The pressed states of the respective clutches B (B1, B2), C are adjusted by controlling respective clutch pistons 201, 202, 203, 204, 205, 206 corresponding to the respective clutches B (B1, B2), C.

In the first main speed change clutch B1, the clutch piston 201 is configured to drive the first-speed clutch B11 by the hydraulic pressure supplied via the first speed change solenoid valve 191, and the clutch piston 203 is configured to drive the third-speed clutch B13 by the hydraulic pressure supplied via the third speed change solenoid valve 193. Also, the flow rate of the operating oil to be supplied to the first main speed change clutch B1 can be adjusted as desired by the first-speed and the third-speed step-up solenoid valve 207, which is a proportional control valve.

In the second main speed change clutch B2, the clutch piston 202 is configured to drive the second-speed clutch B22 by the hydraulic pressure supplied via the second speed change solenoid valve 192, and the clutch piston 204 is configured to drive the fourth-speed clutch B24 by the hydraulic pressure supplied via the fourth speed change solenoid valve 194. Also, the flow rate of the operating oil to be supplied to the first main speed change clutch B1 can be adjusted as desired by the second-speed and the fourth-speed step-up solenoid valve 208, which is a proportional control valve.

In the Hi-Lo clutch C, the clutch piston 205 is configured to drive, as desired, the Hi clutch C1 by the hydraulic pressure supplied via the Hi clutch solenoid valve 195, which is a proportional control valve, and the clutch piston 206 is configured to drive, as desired, the Lo clutch C2 by the hydraulic pressure supplied via the Lo clutch solenoid valve 196, which is a proportional control valve.

Also, the pressed states of the respective clutches (the first main speed change clutch B1, the second main speed change clutch B2 and the Hi-Lo clutch C) to be driven by the respective clutch pistons 201 to 206 are measured by the respective pressure sensors (the first speed change clutch pressure sensor 171, the second speed change clutch pressure sensor 172, the third speed change clutch pressure sensor 173, the fourth speed change clutch pressure sensor 174, the Hi clutch pressure sensor 175 and the Lo clutch pressure sensor 176) provided between the respective solenoid valves 191 to 196 and the respective clutch pistons 201 to 206. Thereby, the pressed states of the respective clutches B (B1, B2), C can be adjusted.

Figure 8:
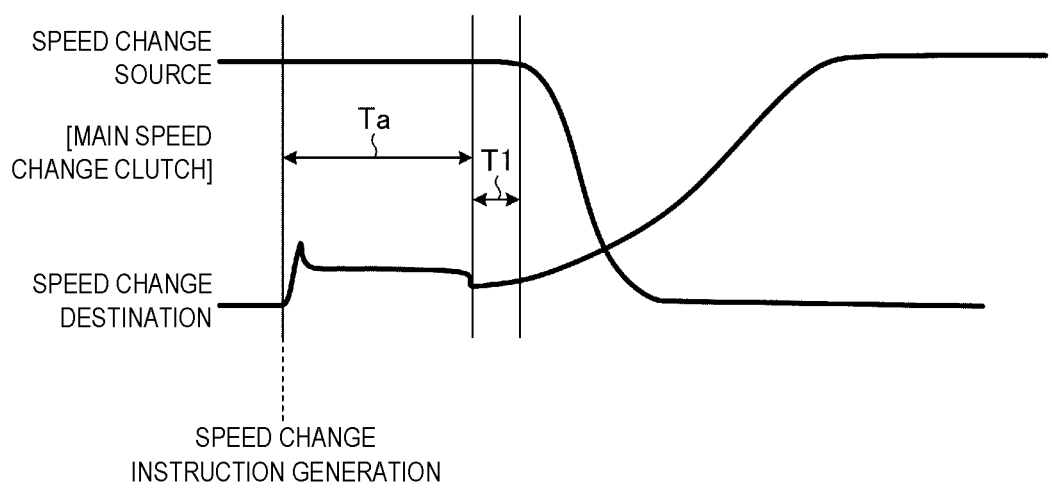
FIG. 8 is a timing chart of speed change control in which the Hi-Lo clutch is not involved.

Reference is now made to examples of speed change control. Here, the speed change control that is to be performed by the traveling system ECU (speed change control device) 170 of the work vehicle (tractor 1) configured as described above is described with reference to FIGS. 8 to 10. FIG. 8 is a timing chart of speed change control in which the Hi-Lo clutch C is not involved. Also, FIG. 9 is a timing chart depicting an example of the speed change control from a high speed stage range to a low speed stage range, in which the speed is changed from the fifth-speed to the fourth-speed of the main speed change. Also, FIG. 10 is a timing chart depicting an example of the speed change control from the low speed stage range to the high speed stage range, in which the speed is changed from the fourth-speed to the fifth-speed of the main speed change. In FIGS. 8 to 10, the vertical axis indicates clutch connection pressures (in units of, e.g., [kgf/cm$^2$]) of the main speed change clutch B and the Hi-Lo clutch C, and the horizontal axis indicates time ([t]).

As described above, the speed change control device 170 performs the forward/reverse switching and the multi-stage speed change of eight speeds by controlling the switching between the forward/reverse clutch A and the Hi-Lo clutch C provided in series before and after the main speed change clutch B, in addition to the main speed change clutch B formed by the first main speed change clutch B1 for first-speed and the third-speed and the second main speed change clutch B2 for second-speed and the fourth-speed provided in the transmission case 12 (refer to FIG. 1).

In some embodiments, the speed change control device 170 may change the speed only by the main speed change clutch B without using the Hi-Lo clutch C (refer to FIG. 4), when changing the speed in the low speed stage range and when changing the speed in the high speed stage range. Specifically, when increasing and decreasing the speed between the first-speed stage and the fourth-speed stage (low speed stage) and when increasing and decreasing the speed between the fifth-speed stage and the eighth-speed stage (high speed stage), the speed change is performed without using the Hi-Lo clutch C. In this case, each speed change is performed by the main speed change clutch B (refer to FIG. 4). In this case, the speed change control device 170 (refer to FIG. 6) controls the Hi-Lo clutch C to continuously output the speed change position during the speed change. Also, the speed change control device 170 controls the forward/reverse clutch A (refer to FIG. 4) to continue the outputs corresponding to the forward/reverse lever (linear lever) and the like. Electromagnetic proportional valves may be used for each of the forward/reverse clutch A, the main speed change clutch B, and the Hi-Lo clutch C.

As shown in FIG. 8, when changing the speed by the main speed change clutch B, after a speed change instruction is generated by the operation of the main speed change lever or the like, the speed change control device 170 performs control of continuously outputting the pressure (clutch connection pressure) of the speed change source-side up to T1 [msec] after an operating oil filling time (initial time) Ta, for which the operating oil is filled in the oil chamber 211 to 216 (refer to FIG. 7) of the speed change destination-side.

At the same time, after the speed change instruction is generated, the speed change control device 170 performs control of increasing the pressure of the speed change destination-side in a prescribed step-up curve after the initial time Ta is over. However, when the pressure of the speed change destination-side becomes equal to or higher than a first value, e.g., 5 kgf/cm$^2$, the speed change control device 170 immediately stops the pressure output of the speed change source-side and keeps (e.g., maintains) the pressure of the speed change destination-side at a second value, e.g., 2 kgf/cm$^2$. Thereafter, when the pressure of the speed change source-side becomes equal to or lower than the second value, e.g., 2 kgf/cm², the speed change control device 170 increases the pressure of the speed change destination-side. In this case, the step-up curve may be a step-up curve at the speed change position during the speed change.

Also, when changing the speed from the high speed stage range to the low speed stage range and from the low speed stage range to the high speed stage range by the Hi-Lo clutch C, for example, when increasing the speed from the fourth-speed to the fifth-speed and decreasing the speed from the fifth-speed to the fourth-speed, the speed change control device 170 performs the speed change control, which is different from the speed change control that is performed when changing the speed within the low speed stage range from the first-speed to the fourth-speed and within the high speed stage range from the fifth-speed to the eighth-speed.

As used herein, the term "clutch meet" may refer to a clutch meeting point. Meanwhile, in an illustrative embodiment, a time to a clutch meet among the main speed change clutch B, the high speed clutch (the Hi clutch) C1, and the low speed clutch (the Lo clutch) C2 of the Hi-Lo clutch C is set to be Hi clutch C1<main speed change clutch B<Lo clutch C2. That is, the time to the clutch meet is shortest for the Hi clutch C1, is next shortest for the main speed change clutch B, and is longest for the Lo clutch C2.

Regarding a reference time of the clutch meet, a time taken to reach a prescribed value of about 5 kgf/cm² by the outputs of the proportional control valves 195, 196, 207, 208 corresponding to the overall pressure output is measured for each of the clutches B and C at shipment, and is stored in a memory (not shown) of the speed change control device 170 of each machine.

When operating each of the clutches B and C, a maximum amount of the operating oil is supplied by the outputs of the proportional control valves 195, 196, 207, 208 corresponding to the overall pressure output for a time (for example, a fractional time such as 0.7 times) shorter than the reference time, based on the reference time of the clutch meet, thereby moving the clutch to a point in the vicinity of the clutch meet point and then performing the clutch meet operation.

In the below, the speed change control, which is performed by the speed change control device 170 of an illustrative embodiment in a shift-down operation for changing the speed from the high speed stage range in which the high speed clutch C1 of the Hi-Lo clutch C is used to the low speed stage range in which the low speed clutch C2 of the Hi-Lo clutch C is used or in a shift-up operation for changing the speed from the low speed stage range to the high speed stage range, is described with reference to FIGS. 9 and 10.

In an illustrative embodiment, in the shift-down operation for changing the speed from the high speed stage range (for example, the fifth-speed) to the low speed stage range (for example, the fourth-speed) or in the shift-up operation for changing the speed from the low speed stage range (for example, the fourth-speed) to the high speed stage range (for example, the fifth-speed), a suppression time period S in which a speed change shock is suppressed is provided before the speed change processing is completed. In the suppression time period S, the power is transmitted by a combination of the high speed clutch C1, which is a speed change source or a speed change destination, of the Hi-Lo clutch C and a speed change stage, which is the speed change destination or the speed change source, of the main speed change clutch B. For example, when changing the speed from the fourth-speed to the fifth-speed or when changing the speed from the fifth-speed to the fourth-speed, the power is transmitted at the eighth-speed in the suppression time period S. Therefore, when the work vehicle is performing a work under load at a farm field, for example, the eighth-speed state is combined with the load state in the suppression time period S, so that the speed change shock can be alleviated.

In FIGS. 9 and 10, the solid line indicates a change in clutch connection pressure of the first-speed clutch B11 and the dotted line indicates a change in clutch connection pressure of the fourth-speed clutch B24. Also, the broken line indicates a change in clutch connection pressure of the Hi clutch C1 of the Hi-Lo clutch C and the dashed-dotted line indicates a change in clutch connection pressure of the Lo clutch C2.

First, a description is given of the main speed change in the shift-up operation from the fourth-speed to the fifth-speed.

Reference is made to an example of maintaining overall pressure of Lo clutch C2 of a speed change source, with reference to FIG. 9.

In FIG. 9, as shown with a step-down pattern (dashed-dotted line) of the Lo clutch C2, which is the speed change source, the speed change control device 170 maintains the overall pressure of the Lo clutch C2, which is the speed change source, for the initial time ta set by the clutch meet reference time of the Hi clutch C1, which is the speed change destination.

Reference is also made to an example of maintaining overall pressure of fourth-speed clutch B24 of a speed change source, with reference to FIG. 9.

As shown with a step-down pattern (dotted line) of the fourth-speed clutch B24, which is the speed change source, the speed change control device 170 keeps the overall pressure of the fourth-speed clutch B24, which is the speed change source, for the initial time ta set by the clutch meet reference time of the first-speed clutch B11, which is the speed change destination.

Reference is also made to an example of step-up of Hi clutch C1 of a speed change destination, with reference to FIG. 9.

As shown with a step-up pattern (broken line) of the Hi clutch C1, which is the speed change destination, the speed change control device 170 starts the step-up by performing a valve output of the proportional control valve 195 when an initial time tb elapses, based on the speed change instruction. The initial time tb is set by the clutch meet reference time of the Hi clutch C1. The valve output is an output equivalent to the pressure instructed by the speed change sensitivity dial 187 (FIG. 6), and the speed change control device 170 increases the pressure when there is a greater need for decreasing the power cutoff during the speed change (e.g., the dial is turned to the right).

Also, as shown with the step-up pattern of the Hi clutch C1, which is the speed change destination, the speed change control device 170 keeps the valve output, which is equivalent to the pressure instructed by the speed change sensitivity dial 187, and a first pressure value Pa, which is a predetermined low pressure, for a first time T1. The first time T1 is set as time until the initial time set by the clutch meet reference time of the first-speed clutch B11 of the main speed change elapses.

Reference is now made to an example of step-up of first-speed clutch B11 of a speed change destination, with reference to FIG. 9.

As shown with a step-up pattern (solid line) of the first-speed clutch C1, which is the speed change destination, the speed change control device 170 performs the valve output by the proportional control valve 207 and starts the step-up of the first-speed clutch B11, which is the speed change destination, when an initial time elapses, based on the speed change instruction. The initial time is set by the clutch meet reference time of the first-speed clutch C1. The valve output is an output equivalent to the pressure instructed by the speed change sensitivity dial 186 (FIG. 6).

By executing the above processing, the overall pressure of the fourth-speed, which is the speed change source, is kept and the Hi clutch C1, which is the speed change destination, is kept at the first pressure value Pa that is the predetermined low pressure, in the suppression time period S, as shown in FIG. 9. Therefore, since the power transmission is performed at the eighth-speed state in the suppression time period S, the speed change shock is alleviated.

Subsequently, a description is given of the main speed change in the shift-down operation from the fifth-speed to the fourth-speed.

Reference is now made to an example of keeping low pressure of Hi clutch C1 of a speed change source, with reference to FIG. 10.

In FIG. 10, as shown with a step-down pattern (broken line) of the Hi clutch C1, which is the speed change source, the speed change control device 170 keeps the Hi clutch C1, which is the speed change source, at a second pressure value Pb, which is a predetermined low pressure, for a second time T2. The second time T2 is set as time in which the clutch meet reference time of the Lo clutch C2, which is the speed change destination, elapses or the pressure of the Lo clutch C2, which is the speed change destination, is equal to or higher than a prescribed low pressure (for example, about 3 Kgf/cm$^2$). Also, the second pressure value Pb is different depending on the set dial value set by the speed change sensitivity dial 187 (FIG. 6). At this time, the speed change control device 170 increases the pressure when there is a greater need for decreasing the power cutoff during the speed change (e.g., the dial is turned to the right).

Reference is also made to an example of keeping low pressure of first-speed clutch B11 of a speed change source, with reference to FIG. 10.

As shown with a step-down pattern (solid line) of the first-speed clutch B11, which is the speed change source, the speed change control device 170 keeps the first-speed clutch B11, which is the speed change source, at a third pressure value Pc, which is a prescribed low pressure (about 1 to 2 Kgf/cm$^2$), for a third time T3. At this time, the pressure of the fourth-speed clutch B24, which is the speed change destination, is equal to or higher than a fourth pressure value Pd, which is a prescribed low pressure (for example, about 2 Kgf/cm$^2$).

Reference is also made to an example of keeping overall pressures of Hi clutch C1 of a speed change source and first-speed clutch B11 of a speed change source, with reference to FIG. 10.

Before the Hi clutch C1, which is the speed change source, and the first-speed clutch B11, which is the speed change source, are kept at the low pressures, i.e., for the initial time tc (or time Tc set by the clutch meet reference time of the fourth-speed clutch B24, which is the speed change destination), the speed change control device 170 keeps the overall pressures of the Hi clutch C1, which is the speed change source, and the first-speed clutch B11, which is the speed change source.

Reference is also made to an example of step-up of Lo clutch C2 of a speed change destination, with reference to FIG. 10.

As shown with a step-up pattern (dashed-dotted line) of the Lo clutch C2, which is the speed change destination, when an initial time Td elapses, the speed change control device 170 drives the proportional control valve 196 with an instructed pressure equivalent to the overall pressure and performs the valve output, based on the speed change instruction. The initial time Td is set by the clutch meet reference time of the Lo clutch C.

Reference is also made to an example of step-up of fourth-speed clutch B24 of a speed change destination, with reference to FIG. 10.

As shown with a step-up pattern (dotted line) of the fourth-speed clutch B24, which is the speed change destination, the speed change control device 170 performs the valve output by the proportional control valve 208 and starts the step-up when an initial time Te elapses, based on the speed change instruction. The initial time Te is set by the clutch meet reference time of the fourth-speed clutch B24. The valve output is an output equivalent to the pressure instructed by the speed change sensitivity dial 186 (FIG. 6), and the speed change control device 170 increases the pressure when there is a greater need for decreasing the power cutoff during the speed change (e.g., the dial is turned to the right).

As described above, during the shift-down operation where the main speed change is switched from the fifth-speed to the fourth-speed, the Hi clutch C1, which is the speed change source, is kept at the second pressure value Pb and the fourth-speed clutch B24, which is the speed change destination, is stepped up to the pressure value exceeding the second pressure value Pb in the suppression time period S, as shown in FIG. 10. Therefore, also in this case, the power transmission is performed at the eighth-speed state in the suppression time period S, so that the speed change shock is alleviated.

With reference to the above illustrative embodiments, a tractor (the work vehicle) and a method for controlling changes in the speed of the tractor may be implemented in a variety of forms, such as the following.

(Aspect 1) A tractor 1 including a power transmission device 13 configured to transmit rotation power from an engine 4 to drive wheels 2, 3, the power transmission device 13 including a plurality of hydraulic main speed change clutches B for a plurality of speed change stages and a hydraulic Hi-Lo clutch C having a high speed clutch C1 and a low speed clutch C2 and capable of changing a speed at a high speed stage or a low speed stage, and configured to transmit power via the main speed change clutches B and the Hi-Lo clutch C; control valves 195, 196, 207, 208 configured to adjust pressed states of the main speed change clutches B and the Hi-Lo clutch C; and a speed change control device 170 configured to control and change the vehicle speed in a multi-stage manner by the main speed change clutches B and the Hi-Lo clutch C, wherein in a shift-up operation for changing the speed from a low speed stage range in which the low speed clutch C2 is used to a high speed stage range in which the high speed clutch C1 is used, the speed change control device 170 decreases the pressure of the low speed clutch C2 while keeping the pressure of the high speed clutch C1 at a first pressure Pa higher than the pressure of the low speed clutch C2 and keeping the pressure of the main speed change clutch B, which is a speed change source, to transmit power by a combination of the high speed clutch C1 and the main speed change clutch B, which is a speed change source, and then decreases the pressure of the main speed change clutch B, which is a speed change source, while increasing the pressure of the high speed clutch C1, which has been kept at the first pressure Pa, and increasing the pressure of the main speed change clutch B, which is a speed change destination.

(Aspect 2) In the above (Aspect 1), the speed change control device 170 has an initial time Ta for the main speed change clutch B, which is to be calculated on the basis of a reference time until the main speed change clutch B reaches a predetermined pressure, supplies an operating oil to an oil chamber 211 for operating the main speed change clutch B, which is a speed change destination, while the initial time Ta for the main speed change clutch B elapses after a speed change instruction, and has a time period S in which a time for which the pressure of the high speed clutch C1 is kept at the first pressure Pa higher than the pressure of the low speed clutch C2 and the initial time Ta for the main speed change clutch B elapse at the same time.

(Aspect 3) A tractor 1 including a power transmission device 13 configured to transmit rotation power from an engine 4 to drive wheels 2, 3, the power transmission device 13 including a plurality of hydraulic main speed change clutches B for a plurality of speed change stages and a hydraulic Hi-Lo clutch C having a high speed clutch C1 and a low speed clutch C2 and capable of changing a speed at a high speed stage or a low speed stage, and configured to transmit power via the main speed change clutches B and the Hi-Lo clutch C; control valves 195, 196, 207, 208 configured to adjust pressed states of the main speed change clutches B and the Hi-Lo clutch C; and a speed change control device 170 configured to control and change a vehicle speed in a multi-stage manner by the main speed change clutches B and the Hi-Lo clutch C, wherein in a shift-down operation for changing a speed from a high speed stage range in which the high speed clutch C1 is used to a low speed stage range in which the low speed clutch C2 is used, the speed change control device 170 keeps the pressure of the high speed clutch C1 at a second pressure Pb higher than a pressure of the low speed clutch C2, decreases the pressure of the main speed change clutch B, which is a speed change source, while keeping the pressure of the high speed clutch C1, starts a rise in the pressure of the main speed change clutch B, which is a speed change destination, and then decreases the pressure of the high speed clutch C1, which has been kept at the second pressure Pb, and increases the pressure of the low speed clutch C2.

(Aspect 4) In the above (Aspect 3), the speed change control device 170 has an initial time Td for the low speed clutch C2, which is to be calculated on the basis of a reference time until the low speed clutch C2 reaches a predetermined pressure, supplies an operating oil to an oil chamber 211 for operating the low speed clutch C2 while the initial time Td elapses after a speed change instruction, and decreases the pressure of the main speed change clutch B, which is a speed change source, and starts a rise in the pressure of the main speed change clutch B, which is a speed change destination, while the initial time Td for the low speed clutch C2 elapses.

(Aspect 5) A method for controlling changes in the speed of the tractor 1 defined in the above (Aspect 1), including the steps of: during main speed change accompanied by speed change from the high speed stage to the low speed stage by the Hi-Lo clutch C, keeping a pressure of a speed change source-side of the Hi-Lo clutch C at a first pressure Pa higher than a pressure of a speed change destination-side for a predetermined time including at least a suppression time period S; decreasing a pressure of a speed change source-side of the main speed change clutch B and starting a pressure rise of a speed change destination-side of the main speed change clutch B while keeping the pressure of the speed change source-side of the Hi-Lo clutch C; ending the suppression time period S by decreasing the pressure of the speed change source-side of the Hi-Lo clutch C kept at the first pressure Pa while increasing gradually a pressure of a speed change destination-side of the main speed change clutch B; and increasing a pressure of a speed change destination-side of the Hi-Lo clutch C.

(Aspect 6) A method for controlling changes in the speed of the tractor 1 defined in the above (Aspect 3), including the steps of: during main speed change accompanied by speed change from the low speed stage to the high speed stage by the Hi-Lo clutch C, decreasing a pressure of a speed change source-side of the Hi-Lo clutch C while keeping a pressure of a speed change source-side of the main speed change clutch B for a predetermined time; keeping a pressure of a speed change destination-side of the Hi-Lo clutch C at a second pressure Pb higher than a pressure of the speed change source-side for a suppression time period S; decreasing the pressure of the speed change source-side of the main speed change clutch B and increasing the pressure of the speed change destination-side of the Hi-Lo clutch C kept at the second pressure Pb; and increasing gradually a pressure of a speed change destination-side of the main speed change clutch B.

The above illustrative embodiments are just exemplary and are not intended to limit the scope of the present disclosure. The illustrative embodiments can be implemented in a variety of other forms and can be diversely omitted, replaced, combined and changed without departing from the gist of the present disclosure.

Also, the respective configurations, shapes, and specifications of the display elements (structures, types, directions, shapes, sizes, lengths, widths, thicknesses, heights, the number, arrangement, positions, materials and the like) can be appropriately changed.

Also, the additional effects and modified embodiments of the illustrative embodiments can be easily conceived by one skilled in the art. For this reason, the wider aspect of the present disclosure is not limited to the specific details and representative illustrative embodiments described in the above. Therefore, the illustrative embodiments can be diversely changed without departing from the spirit or scope of the general inventive concept, which may be defined by the claims and equivalents thereto.

REFERENCE SIGNS LIST

1: work vehicle (tractor)
2: front wheel
3: rear wheel
4: engine
13: power transmission device
170: traveling system ECU (speed change control device)
171 to 176: pressure sensor
195: proportional control valve (Hi clutch solenoid valve)
196: proportional control valve (Lo clutch solenoid valve)
201 to 206: clutch piston
207: proportional control valve (first-speed and third-speed step-up solenoid valve)
208: proportional control valve (second-speed and fourth-speed step-up solenoid valve)
B: main speed change clutch
C: Hi-Lo clutch
C1: high speed clutch C2: low speed clutch
S: suppression time period
Pa: first pressure
Pb: second pressure
T1: first time
T2: second time (predetermined time)

What is claimed is:

1. A work vehicle comprising:
a power transmission device configured to transmit rotation power from an engine to drive wheels, the power transmission device comprising a plurality of hydraulic main speed change clutches for a plurality of speed change stages and a hydraulic Hi-Lo clutch having a high speed clutch and a low speed clutch and capable of changing a speed at a high speed stage or a low speed stage, and configured to transmit power via the main speed change clutches and the Hi-Lo clutch;
control valves configured to adjust pressed states of the main speed change clutches and the Hi-Lo clutch; and
a speed change control device configured to:
control and change a vehicle speed in a multi-stage manner by the main speed change clutches and the Hi-Lo clutch, and
perform a shift-up operation for changing a speed from a low speed stage range in which the low speed clutch is used to a high speed stage range in which the high speed clutch is used, wherein the speed change control device is configured to decrease a pressure of the low speed clutch while keeping a pressure of the high speed clutch at a first pressure higher than the pressure of the low speed clutch and keep a pressure of a first clutch of the main speed change clutches that is a speed change source, to transmit power by a combination of the high speed clutch and the first clutch, and thereafter decrease the pressure of the first clutch while increasing the pressure of the high speed clutch, which has been kept at the first pressure and increase the pressure of a second clutch of the main speed change clutches that is a speed change destination.

2. The work vehicle according to claim 1, wherein the speed change control device is configured to:
operate with an initial time for the first clutch, the initial time calculated on the basis of a reference time until the first clutch reaches a predetermined pressure,
supply an operating oil to an oil chamber for operating the second clutch, while the initial time for the first clutch elapses after a speed change instruction, and
operate with a time period in which a time for which the pressure of the high speed clutch is kept at the first pressure higher than the pressure of the low speed clutch and
the initial time for the first clutch
elapse at the same time.

3. A work vehicle comprising:
a power transmission device configured to transmit rotation power from an engine to drive wheels, the power transmission device comprising a plurality of hydraulic main speed change clutches for a plurality of speed change stages and a hydraulic Hi-Lo clutch having a high speed clutch and a low speed clutch and capable of changing a speed at a high speed stage or a low speed stage, and configured to transmit power via the main speed change clutches and the Hi-Lo clutch;
control valves configured to adjust pressed states of the main speed change clutches and the Hi-Lo clutch; and
a speed change control device configured to
control and change a vehicle speed in a multi-stage manner by the main speed change clutches and the Hi-Lo clutch, and
perform a shift-down operation for changing a speed from a high speed stage range in which the high speed clutch is used to a low speed stage range in which the low speed clutch is used, wherein the speed change control device is configured to keep a pressure of the high speed clutch at a second pressure higher than a pressure of the low speed clutch, decrease a pressure of a first clutch of the main speed change clutches that is a speed change source, while keeping the pressure of the high speed clutch, start a rise in the pressure of a second clutch of the main speed change clutches that is a speed change destination, and thereafter decrease the pressure of the high speed clutch, which has been kept at the second pressure, and increase the pressure of the low speed clutch.

4. The work vehicle according to claim 3, wherein the speed change control device is configured to:
operate with an initial time for the low speed clutch, the initial time being calculated on the basis of a reference time until the low speed clutch reaches a predetermined pressure,
supply an operating oil to an oil chamber for operating the low speed clutch while the initial time elapses after a speed change instruction, and
decrease the pressure of the first clutch and start a rise in pressure of the second clutch while the initial time for the low speed clutch elapses.

* * * * *